United States Patent
Bauer

(10) Patent No.: US 9,598,996 B2
(45) Date of Patent: Mar. 21, 2017

(54) METHOD FOR FEEDING REDUCING AGENT AND MOTOR VEHICLE AND STATIONARY INSTALLATION IN WHICH THE METHOD IS PERFORMED

(71) Applicant: EMITEC GESELLSCHAFT FUER EMISSIONSTECHNOLOGIE MBH, Lohmar (DE)

(72) Inventor: Peter Bauer, Siegburg (DE)

(73) Assignee: EMITEC Gesellschaft fuer Emissionstechnologie mbH, Lohmar (DE)

(*) Notice: Subject to any disclaimer, the term of this patent is extended or adjusted under 35 U.S.C. 154(b) by 44 days.

(21) Appl. No.: 14/589,070

(22) Filed: Jan. 5, 2015

(65) Prior Publication Data

US 2015/0113958 A1    Apr. 30, 2015

Related U.S. Application Data

(63) Continuation of application No. PCT/EP2013/062879, filed on Jun. 20, 2013.

(30) Foreign Application Priority Data

Jul. 4, 2012   (DE) .................. 10 2012 105 954

(51) Int. Cl.
    *F01N 3/20*   (2006.01)
(52) U.S. Cl.
    CPC .......... *F01N 3/208* (2013.01); *F01N 2370/04* (2013.01); *F01N 2550/05* (2013.01);
    (Continued)

(58) Field of Classification Search
    CPC ......... F01N 2550/03; F01N 2900/1621; F01N 2900/1622
    See application file for complete search history.

(56) References Cited

U.S. PATENT DOCUMENTS 9,170,244 B2    10/2015  Niemeyer
2009/0272102 A1  11/2009  Ofoli et al.
(Continued)

FOREIGN PATENT DOCUMENTS

CN    101818679 A    9/2010
CN    102016250 A    4/2011
(Continued)

*Primary Examiner* — Jonathan Matthias
(74) *Attorney, Agent, or Firm* — Laurence A. Greenberg; Werner H. Stemer; Ralph E. Locher

(57) ABSTRACT

A method for feeding reducing agent to an exhaust gas mass flow in an exhaust gas treatment device provides a reducing agent feed port, a storage catalytic converter storing reducing agent and an SCR catalytic converter for selective catalytic reduction of nitrogen oxygen compounds in exhaust gas. A first dosing strategy is followed, loading of the storage catalytic converter with reducing agent is monitored and a first target conversion rate is determined based on current loading. Reducing agent is fed according to the first target conversion rate. A current conversion rate obtained with the SCR catalytic converter is determined. The current conversion rate is compared to the first target conversion rate and any deviation is registered. A further dosing strategy, not considering the loading of the storage catalytic converter, is used if the deviation exceeds a first threshold value. A motor vehicle and a stationary installation are also provided.

11 Claims, 2 Drawing Sheets

(52) U.S. Cl.
CPC .... *F01N 2560/026* (2013.01); *F01N 2610/02* (2013.01); *F01N 2610/1406* (2013.01); *F01N 2900/0418* (2013.01); *F01N 2900/1402* (2013.01); *F01N 2900/1621* (2013.01); *F01N 2900/1622* (2013.01); *Y02T 10/24* (2013.01)

(56) References Cited

U.S. PATENT DOCUMENTS

| | | |
|---|---|---|
| 2011/0113753 A1 | 5/2011 | Christner et al. |
| 2012/0006004 A1* | 1/2012 | Tai .................... F01N 3/208 60/274 |
| 2013/0167512 A1 | 7/2013 | Brueck et al. |

FOREIGN PATENT DOCUMENTS

| | | |
|---|---|---|
| DE | 10 2008 036 885 A1 | 2/2010 |
| DE | 10 2010 034 707 A1 | 2/2012 |
| DE | 10 2010 049 070 A1 | 4/2012 |
| DE | 102011011441 B3 | 6/2012 |
| WO | 2012022687 A1 | 2/2012 |

\* cited by examiner

METHOD FOR FEEDING REDUCING AGENT AND MOTOR VEHICLE AND STATIONARY INSTALLATION IN WHICH THE METHOD IS PERFORMED

CROSS-REFERENCE TO RELATED APPLICATION

This is a continuation, under 35 U.S.C. §120, of copending International Application No. PCT/EP2013/062879, filed Jun. 20, 2013, which designated the United States; this application also claims the priority, under 35 U.S.C. §119, of German Patent Application DE 10 2012 105 954.3, filed Jul. 4, 2012; the prior applications are herewith incorporated by reference in their entirety.

BACKGROUND OF THE INVENTION

Field of the Invention:
The invention relates to a method for feeding reducing agent into an exhaust-gas mass flow in an exhaust-gas treatment device, in particular for mobile internal combustion engines. The invention also relates to a motor vehicle and a stationary installation in which the method is performed.

In order to prevent the release of nitrogen oxide compounds resulting from combustion in modern internal combustion engines, in particular in diesel engines, the SCR (selective catalytic reduction) method has become established. For that purpose, an SCR catalytic converter is used which has a coating that enables the reaction to occur at relatively low temperatures. During the selective catalytic reduction, nitrogen oxide compounds are caused to react with ammonia, in such a way that nitrogen and water are formed. In order to achieve as high a conversion rate as possible, it is desirable for the greatest possible amount of ammonia to be available for the reaction. It is, however, simultaneously necessary that as little ammonia as possible exits the SCR catalytic converter or the exhaust-gas treatment device again, because ammonia is perceptible in the form of an unpleasant smell even in small quantities. The stoichiometric metering of ammonia thus represents the desired metering quantity. The metering of ammonia into the outflowing exhaust gas in the respectively required quantity is an objective that has heretofore been unachievable or achievable only with very low accuracy despite very high outlay in terms of control technology. Therefore, storage catalytic converters are often used which store excess quantities of metered ammonia and, in the event of underdosing of ammonia, make stored ammonia available again for the reaction with the exhaust gas. It is also sought in that way to prevent very frequent operation of the metering system (injectors, pumps, etc.), in order to be able to realize the least possible wear and energy consumption thereof.

A disadvantage of a storage catalytic converter is that the storage of ammonia in a storage catalytic converter is subject to numerous boundary conditions that influence the maximum storage quantity, that is to say the fill level, of the storage catalytic converter. The maximum loading is subject, inter alia, to intense temperature dependency and to aging, in particular due to thermally induced changes of the storage coating. Furthermore, measurement sensors for the controlling of the loading of the storage catalytic converter are also affected by various disturbance variables. Altogether, they can result in erroneous control events, which reduce the utilization of the storage catalytic converter or even make such utilization impossible.

SUMMARY OF THE INVENTION

It is accordingly an object of the invention to provide a method for feeding reducing agent and a motor vehicle and a stationary installation in which the method is performed, which at least partially overcome the hereinafore-mentioned disadvantages and problems of the heretofore-known methods, vehicles and installations of this general type.

With the foregoing and other objects in view there is provided, in accordance with the invention, a method for feeding reducing agent into an exhaust-gas mass flow in an exhaust-gas treatment device, which comprises:

providing the exhaust-gas treatment device with a feed point for the reducing agent, a storage catalytic converter for the storage of reducing agent, and an SCR catalytic converter for performing a selective catalytic reduction of nitrogen oxide compounds in the exhaust gas;

a) implementing a first dosing strategy, wherein the loading of the storage catalytic converter with reducing agent is monitored and a first target conversion rate is determined on the basis of the present loading;

b) feeding reducing agent in accordance with the first target conversion rate;

c) determining a presently prevailing conversion rate attained with the SCR catalytic converter;

d) comparing the presently prevailing conversion rate with the first target conversion rate, and registering a deviation; and e) switching to a further dosing strategy if the deviation exceeds a first threshold value, wherein, in the further dosing strategy, the loading of the storage catalytic converter is disregarded.

The reducing agent to be fed may be added to the exhaust-gas mass flow in the exhaust-gas treatment device in the form of gaseous ammonia and/or a reducing agent precursor, for example a urea-water solution. This is either directly added to the exhaust gas and converted thermally into ammonia and water (thermolysis), and/or is initially prepared (outside the exhaust gas and/or within the exhaust gas) in a hydrolysis catalytic converter to form ammonia (hydrolysis). The urea-water solution known under the trademark AdBlue®, containing 32.5% urea, is commonly used as the reducing agent. For this purpose, the reducing agent is generally admixed to the exhaust gas by way of a dosing nozzle, a valve or an injector, wherein good mixing of the exhaust gas with the reducing agent is assisted, for example by using a mixer. It is achieved in this way that the two reactants—nitrogen oxide compound and ammonia— come into contact with one another, and can react, in the exhaust-gas treatment device. This feed of reducing agent is performed through the feed point that is provided in the exhaust-gas treatment device. The exhaust-gas treatment device is connected through an exhaust line to an internal combustion engine. The internal combustion engine is, in particular, a diesel internal combustion engine.

A storage catalytic converter, which is provided for the storage of reducing agent or exclusively ammonia, is provided in the exhaust-gas treatment device downstream of the feed point. For this purpose, the storage catalytic converter has a corresponding coating, for example a coating with iron zeolite or with copper zeolite. Such coatings typically yield a storage capacity of approximately 1 gram of ammonia per liter. The storage capacity is generally restricted to a relatively narrow temperature range, for example between 100 and 400° C., wherein the storage capacity rapidly decreases in each case toward the temperature boundaries. The exact temperature boundaries and the exact dependency of the storage capacity on the temperature are dependent on the respective coating.

Furthermore, an SCR catalytic converter is provided in the exhaust-gas treatment device. The storage catalytic converter and the SCR catalytic converter may also be realized in one catalytic converter substrate body. The catalytic converter substrate body then preferably has a coating which has a storage capacity and which can furthermore catalyze an SCR reaction.

In the SCR catalytic converter, the selective catalytic reduction of nitrogen oxide compounds by using the reducing agent is made possible at low temperatures, for example even from temperatures of 130° C. to 150° C. The absorption of ammonia in the SCR catalytic converter even begins slightly earlier (depending on the type of coating).

In the method, a first dosing strategy is implemented with which it is intended to attain the target conversion rate of nitrogen oxide compounds in the SCR catalytic converter. The target conversion rate is a parameter that indicates the theoretical intensity of the conversion of nitrogen oxide compounds in the exhaust gas under the present operating conditions of the internal combustion engine and exhaust-gas treatment device.

In this case, the present loading in the storage catalytic converter is determined. The loading refers to the absolute quantity of available reducing agent which is stored by the coating in the storage catalytic converter and which is available for reaction with exhaust gas or nitrogen oxide compounds that is/are conducted through. It is assumed in this case that the maximum absorption capacity of the storage catalytic converter is known, and that it is possible, taking into consideration the metering of reducing agent and/or the ambient conditions, to determine what percentage of the maximum absorption capacity has presently been reached. The absolute quantity of available reducing agent can thus also be determined.

Furthermore, storage capacity that is (still) available or unutilized in the storage catalytic converter is determined. As already mentioned, the storage capacity of the storage catalytic converter is dependent on the present temperature. For example, if the temperature is too low or too high, the storage capacity decreases rapidly. Furthermore, the storage capacity is, however, additionally affected by aging of the storage catalytic converter and/or possible contamination of the storage material with, for example, sulfur in fuels and accordingly sulfate formation, which reduces or even (partially) prevents the storage of ammonia. The storage capacity typically decreases with progressive aging. In this case, the fill level and the storage capacity may themselves be determined in model-based fashion, for example by way of a look-up table (a characteristic map). These may, however, also be determined by direct measurements of the metered quantity and of the present conversion rate and/or the slippage, that is to say passage of reducing agent through the SCR catalytic converter due to a superstoichiometric quantity of reducing agent.

The target conversion rate of nitrogen oxide compounds in the SCR catalytic converter is determined in model-based fashion. The target conversion rate is preferably determined by taking into consideration different measurement values, such as for example the temperature of the SCR catalytic converter, of the storage catalytic converter, of the nitrogen oxide compounds in the present exhaust gas and the like, which simulates the actual processes under the prevailing conditions into a model by control technology. In this case, empirical data and/or functions may be used. Furthermore, it is possible for the fill level and/or the storage capacity of the storage catalytic converter, as well as the present operating state of the internal combustion engine and/or a predicted operating state, to be taken into consideration in model-based fashion in order to determine the model-based target conversion rate.

In order to achieve the target conversion rate, the metering of reducing agent, that is to say the reducing agent feed rate, is adapted correspondingly. This means that a superstoichiometric quantity of reducing agent is metered in if, for example, the storage catalytic converter is empty (or a predefined minimum loading is undershot) and the storage capacity is sufficient. By contrast, a substoichiometric quantity of reducing agent is metered in if a decrease in the storage capacity is impending and a predefined maximum loading is present in the storage catalytic converter, so that the storage catalytic converter is evacuated in good time before ammonia slippage occurs.

The result of the first dosing strategy is attained through monitoring of the present conversion rate. For example, the present conversion rate is determined by using a nitrogen oxide sensor, in such a way that a deviation from the target conversion rate can be detected. In the control unit that is set up for carrying out the method, a deviation between the present conversion rate and the set target conversion rate is registered.

If the present conversion rate deviates from the target conversion rate to too great an extent, a further, different dosing strategy is initiated. This is determined by way of a comparison of the registered deviation with a first threshold value. If the deviations are too great, it is possible that there is an error in the first dosing strategy.

In order to counteract that error, a further dosing strategy is selected which operates without taking into consideration the storage catalytic converter. That is to say, if the target conversion rate cannot be attained with the storage catalytic converter loading being taken into consideration, a dosing can be determined directly by way of the further dosing strategy. The dosing strategy assumes that no reducing agent is available for the conversion of nitrogen oxide compounds that is not provided by the direct supply of reducing agent directly in close chronological proximity. It is thus assumed, in particular, that a storage catalytic converter is not operational, or is blocked.

In accordance with another advantageous mode of the method of the invention, step e) is performed only if, in step d), a deviation is registered over a time period that is longer than a predetermined maximum duration.

In this embodiment of the method, a switch to a different dosing strategy is not made immediately upon first exceeding the first threshold value but only when this occurs over a predetermined time period of a maximum duration. In this way, erratic control behavior, which could be triggered by normal irregularities and/or measurement deviations, is prevented. A further advantage in this case is that the first threshold value can be set very close to the target conversion rate. This means that even a small deviation can lead to the triggering of a change in dosing strategy. In this case, it is possible to achieve very exact adherence to the target conversion rate. This is because, if the first threshold value is exceeded over a time period longer than the predetermined maximum duration, it can be assumed with certainty that the first dosing strategy is presently based on an erroneous model or leads to erroneous results.

Furthermore, the method may be configured in such a way that a device for detecting the time period is reset again when a deviation is no longer present, and is restarted only upon the first recurrence of a deviation. It is, however, also possible for deviations to be detected over a relatively long time interval with respect to one another, that is to say that, in terms of time, between the occurrence of deviations that exceed the first threshold value, the conversion rate may correspond to the target conversion rate and/or (small) deviations may arise that do not exceed the first threshold value. In this case, if appropriate, the number of deviations that may occur in a predetermined maximum time period without a switch in dosing strategy being performed is determined.

In the event of a switch in dosing strategy, the device for detecting the time period is preferably reset. After the switch, it is initially assumed that suitable dosing of reducing agent can then be performed with the further dosing strategy.

In a further embodiment of the method, the device for detecting the time period is not reset in the event of a switch in dosing strategy, and instead, instances of exceeding the first threshold value are taken into consideration, in averaged form, together with instances of exceeding a second threshold value in order to be able to be used, if appropriate, as a criterion for the switch to a yet further dosing strategy (for example a third dosing strategy).

In accordance with a further advantageous mode of the method of the invention, after step e), the further dosing strategy is implemented for a predetermined time period that is longer than the predetermined maximum duration, and a switch is subsequently made back to the first dosing strategy according to step a).

As a result of the implementation of a further dosing strategy after step e) for a predetermined time period that is longer than the predetermined maximum duration that led to the triggering of the further dosing strategy, it can be ensured that an adequate time period has been afforded in such a way that an erroneous state in the exhaust-gas treatment device, that has resulted due to the implementation of the first dosing strategy, has been corrected if the further dosing strategy now represents an adequate approximation to the actual conversion. For example, the further dosing strategy could encompass an elimination of contamination of the storage catalytic converter by virtue of the exhaust-gas temperatures being raised (second dosing strategy=decontamination strategy). In the case of a decontamination process of that type, the temperature is raised so high that the storage capacity of the storage catalytic converter is very low to non-existent. The second dosing strategy must therefore be implemented after an evacuation and/or during the heating of the storage catalytic converter, as if no storage catalytic converter was present and a conversion is taking place at high exhaust gas temperatures. Furthermore, by using such an embodiment of the method, unnecessarily rapid switching between the dosing strategies can be prevented, whereby the systems are protected. Furthermore, in this way, the (unknown) quantity of ammonia present in storage is depleted. The ammonia quantity can cause "slippage," with the result that ammonia emerges from the exhaust system.

In accordance with an added advantageous mode of the method of the invention, in order to determine the loading of the storage catalytic converter, a fill level model which is reset after the predetermined time period is used.

The fill level model provides the basis for the metering of reducing agent in the first dosing strategy. If the desired fill level and the maximum fill level now differ to too great an extent, that is to say the maximum fill level falls below the storage capacity of the storage catalytic converter that is customary in normal states, there is for example an offset in the fill level model. Thus, if the fill level model is reset, it is possible for the offset to be made utilizable for the conversion again. In particular, after a decontamination strategy has been successfully implemented, the storage capacity of the storage catalytic converter is increased, in such a way that a reset of the fill level model for better utilization of the loading is made possible. By way of the controller, the fill level model is adapted to the actual conditions of the storage catalytic converter again, and is not restricted by measurement values from before the further dosing strategy.

In accordance with an additional advantageous mode of the method of the invention, a reduced second target conversion rate is set in the further dosing strategy. The further dosing strategy is preferably otherwise implemented in the same way as the first dosing strategy.

Due to the second target conversion rate that is reduced in relation to the first target conversion rate, the quantity of reducing agent that is metered in, that is to say the reducing agent feed rate, is reduced. In this way, in the case of a functional storage catalytic converter, the fill level or the loading is reduced, or the storage catalytic converter is evacuated. It is, however, at least the case that the storage catalytic converter is filled no further if a corresponding quantity of nitrogen oxide compounds in the exhaust gas is correctly determined and/or the reducing agent feed rate is adapted despite incorrect determined values. The first target conversion rate may for example demand a reduction in nitrogen oxide emissions of between 60 percent and 100 percent. The second target conversion rate may be lower by a factor of 0.5 to 0.95 in order to reliably prevent actual malfunctions of the exhaust system and/or control fault messages.

In accordance with yet another advantageous mode of the method of the invention, in order to implement the dosing strategy (1) in step a), a steady-state proportional controller (35) is used if an operating state of the exhaust-gas treatment device (23 prevails, and a dynamic proportional-integral controller (37) is used if a dynamic operating state of the internal combustion engine prevails, wherein, in step d), a comparison between a first control value of the steady-state proportional-integral controller and a second control value of the dynamic proportional-integral controller is performed and is taken into consideration in addition to the deviation. The implementation of the dosing strategy (1) refers to the setting of the rate with which reducing agent is to be fed in accordance with the target conversion rate from step a) in step b). The first control value and the second control value correspond in each case to a rate with which reducing agent is to be fed as determined or defined by a controller in a manner dependent on the target conversion rate from step a).

A steady operating state of an exhaust-gas treatment device is distinguished by unchanging or only slowly changing operating parameters of the exhaust-gas treatment device, and occurs for example when an internal combustion engine connected to the exhaust-gas treatment device is operated at constant load and rotational speed. A dynamic operating state of an exhaust-gas treatment device is distinguished by rapidly changing operating parameters of the exhaust-gas treatment device and occurs in particular in the event of frequent and rapid changes in load and rotational speed of the internal combustion engine. The question of whether a dynamic or steady operating state is present may be identified for example on the basis of the gradient of an operating parameter of the exhaust-gas treatment device. If the gradient of a certain operating parameter exceeds a predefined threshold value, a dynamic operating state is present. A steady operating state is otherwise present.

Through the use of operation with two different controllers in different operating states, particularly accurate and at the same time particularly reliable controlling of the dosing quantity within the dosing strategy is possible. For example, the steady-state proportional-integral controller may be suitable for setting a dosing quantity in a particularly exact manner. The dynamic proportional-integral controller is, for this purpose, less susceptible to errors with regard to fluctuating operating conditions in the exhaust-gas treatment device.

In order to carry out the method in accordance with this embodiment, the control unit which is set up to carry out the described method is set up to determine a first control value by using a steady-state proportional-integral controller (PI controller) and a second control value by using a dynamic proportional-integral controller (PI controller).

The PI controller combines the characteristics of a P controller and an I controller. By way of the P component, a corrective intervention into the loop which is proportional to the control deviation is immediately attained. The I component has the effect that previous control variables are also taken into consideration, and thus an excessively intense reaction to a singularly occurring deviation is attenuated. The PI controller is suitable for adjusting the control variable to the reference variable rapidly and without permanent deviation. In this case, the steady-state proportional-integral controller is set up in such a way that the memory value for the integral component of the regulator remains unchanged, and preferably, the input variables remain constant. By contrast, the dynamic proportional-integral controller may have varying input variables supplied thereto, but in particular, only the integral component (or memory component) is reset under certain conditions.

The conditions for the resetting of the integral component may for example be the switch in dosing strategy. As a result of the resetting, the proportional-integral controller adapts to the present input values without effecting an adjustment, as described above, based on the previously attained control values. In simple terms, the steady-state proportional-integral controller maintains its memory and processes the preceding input variables in the present calculation of the control value, whereas the dynamic proportional-integral controller, when it has just been reset, reacts only to the present value. The dynamic proportional-integral controller is for example set up to react with a damping action on the present input variables only within a dosing strategy, and to prevent a damping action from the preceding dosing strategy from also having an effect. Accordingly, if the deviation between the two control values is too great, it is to be assumed that the desired conversion rate is currently deviating from the present conversion rate.

In accordance with yet a further advantageous mode of the method of the invention, the deviation is compared with a multiplicity of threshold values, wherein the further dosing strategy is selected, on the basis of the threshold values, in accordance with the following procedure:
  deviation smaller than the first threshold value: the first dosing strategy continues to be implemented;
  deviation greater than the first threshold value and smaller than a second threshold value: a second dosing strategy is implemented;
  deviation greater than the second threshold value and smaller than a third threshold value: a third dosing strategy is implemented;
  deviation greater than the third threshold value: a fourth dosing strategy is implemented.

In the successive dosing strategies (first, second, third, fourth dosing strategy), different target values may be implemented in such a way that the exhaust-gas treatment device is reset into a state in which a first target conversion rate can be attained again. For this purpose, for example, the temperature of the exhaust gas may be raised in order to decontaminate the storage catalytic converter, the storage catalytic converter may be evacuated, and/or other measures may be implemented in order to increase the functionality of the storage catalytic converter and of the SCR catalytic converter again. If appropriate, however, a dosing strategy may also encompass the target conversion rate being set in such a way that a storage catalytic converter is not required. In this way, it is possible to attain adequately precise controlling even if the storage catalytic converter is no longer adequately functional.

In this case, the dosing strategies may be staggered or predefined in terms of the sequence of initiation. A first dosing strategy is implemented in the presence of optimum conversion in a fully functional system (base strategy). A second dosing strategy is implemented if it is intended to realize an adaptation of the loading by evacuation of the storage catalytic converter (loading reduction strategy or offset correction strategy), that is to say a reduced reducing agent feed rate is set. A third dosing strategy may be predefined for reduced conversion simultaneous to an evacuation and decontamination by burn-off of sulfates (decontamination strategy). A fourth dosing strategy may be set up for permanent operation without a storage catalytic converter (emergency strategy) in the event of the storage catalytic converter no longer being (adequately) functional and/or not reacting to regeneration efforts. Other sequences and strategies are, however, also possible.

In one advantageous embodiment of the method, the integral control component of a PI controller is, for the implementation of one of the dosing strategies, reset in the event of a switch in dosing strategy. The integral control component of a PI controller permits a long-term and accurate adaptation of the dosing quantity to the prevailing operating conditions. Through the use of the integral control component, such an adaptation is successfully possible in the presence of a steady operating state of the exhaust-gas treatment device. In the presence of a dynamic operating state of the exhaust-gas treatment device, such an adaptation is normally not possible because the integral controller cannot react rapidly enough in the event of short-term changes in operating parameters. It is therefore advantageous for the integral control component to be reset in a dynamic operating state.

In the described method, a switch in dosing strategy is a strong indicator of the presence of a dynamic operating state. Normally, the deviation between the prevailing conversion rate and the target conversion rate, as determined in step d) of the method, is associated with a dynamic operating state. It is therefore advantageous for the integral control component to be reset in the event of a switch in dosing strategy.

Due to the setting of the target values, a particularly accurate conversion rate or reducing agent feed rate is attained. The power output is proportional to the generation of nitrogen oxide compounds. In this case, setting of an absolute target value on the basis of the power output realizes particularly exact target value determination without the need for direct measurement values. An absolute target value for the mass flow of nitrogen oxide compounds is for example oriented to the exhaust-gas standards prescribed by law. An exhaust-gas standard constitutes for example the upper limit of the permitted mass of nitrogen oxide compounds in the purified exhaust gas. The setting of a percentage target value for the reduction of nitrogen oxide compounds is in particular oriented to the capability for conversion of nitrogen oxide compounds in the exhaust-gas purification process, and is therefore particularly reliable.

In one advantageous embodiment of the method, in at least one of the dosing strategies (the first dosing strategy and/or in at least one of the further dosing strategies), a target conversion rate is selected from the group of the following target conversion rates:

- a first target conversion rate which relates to the power output of an internal combustion engine connected to the exhaust-gas treatment device;
- a second target conversion rate which relates to the mass flow of nitrogen oxide compounds in the purified exhaust gases (exiting the exhaust-gas treatment device); and
- a third target conversion rate which predefines a ratio between a quantity of nitrogen oxide compounds upstream of the SCR catalytic converter and a quantity of nitrogen oxide compounds downstream of the SCR catalytic converter.

A target conversion rate is a calculated value that indicates what fraction of the entirety of the nitrogen oxide compounds present in the non-purified exhaust gas should be converted in the SCR catalytic converter.

In one advantageous embodiment of the method, in the dosing strategy in which the different target conversion rates are calculated, that target conversion rate is selected which predefines the lowest level of conversion of nitrogen oxide compounds. Through the selection of the target conversion rate, it is achieved that the target conversion rate can be attained with high probability, and at the same time, slippage is reliably prevented.

In a further advantageous embodiment of the method, before an activation of the described method (before step a)), to set a starting time, the dosing quantity is reduced until there is no loading in the storage catalytic converter, and the starting time is then set. The method is thus started with the storage catalytic converter empty. By setting the starting time when there is no longer any loading present, it is possible to prevent model-inherent calculation errors from leading to an erroneous implementation of a dosing strategy. In particular, an offset of the actually present fill level is avoided or eliminated again. It may be the case that, during the operation of an internal combustion engine, a restart with a new activation of the described method occurs at regular intervals, with it being ensured in each case that no loading is present in the storage catalytic converter.

In accordance with yet an added advantageous mode of the method of the invention, method steps a) to e) are performed repeatedly at regular intervals in the manner of a loop.

With the objects of the invention in view, there is also provided a motor vehicle, comprising an internal combustion engine and an exhaust-gas treatment device for purification of the exhaust gases of the internal combustion engine. The exhaust-gas treatment device has a feed point for the reducing agent, a storage catalytic converter for the storage of reducing agent, and an SCR catalytic converter for performing a selective catalytic reduction of nitrogen oxide compounds in the exhaust gas. A control unit is constructed and set up or programmed for carrying out a method as described herein.

With the objects of the invention in view, there is concomitantly provided a stationary installation, comprising an internal combustion engine and an exhaust-gas treatment device for purification of the exhaust gases of the internal combustion engine. The exhaust-gas treatment device has a feed point for the reducing agent, a storage catalytic converter for the storage of reducing agent, and an SCR catalytic converter for performing a selective catalytic reduction of nitrogen oxide compounds in the exhaust gas. A control unit is constructed and set up or programmed for carrying out a method as described herein. A stationary or static installation of this type may for example be an electrical generator.

Other features which are considered as characteristic for the invention are set forth in the appended claims, noting that the features specified individually in the claims may be combined in any desired technologically meaningful way and may be supplemented by explanatory facts from the description and details from the figures, with further embodiments of the invention being specified.

Although the invention is illustrated and described herein as embodied in a method for feeding reducing agent and a motor vehicle and a stationary installation in which the method is performed, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
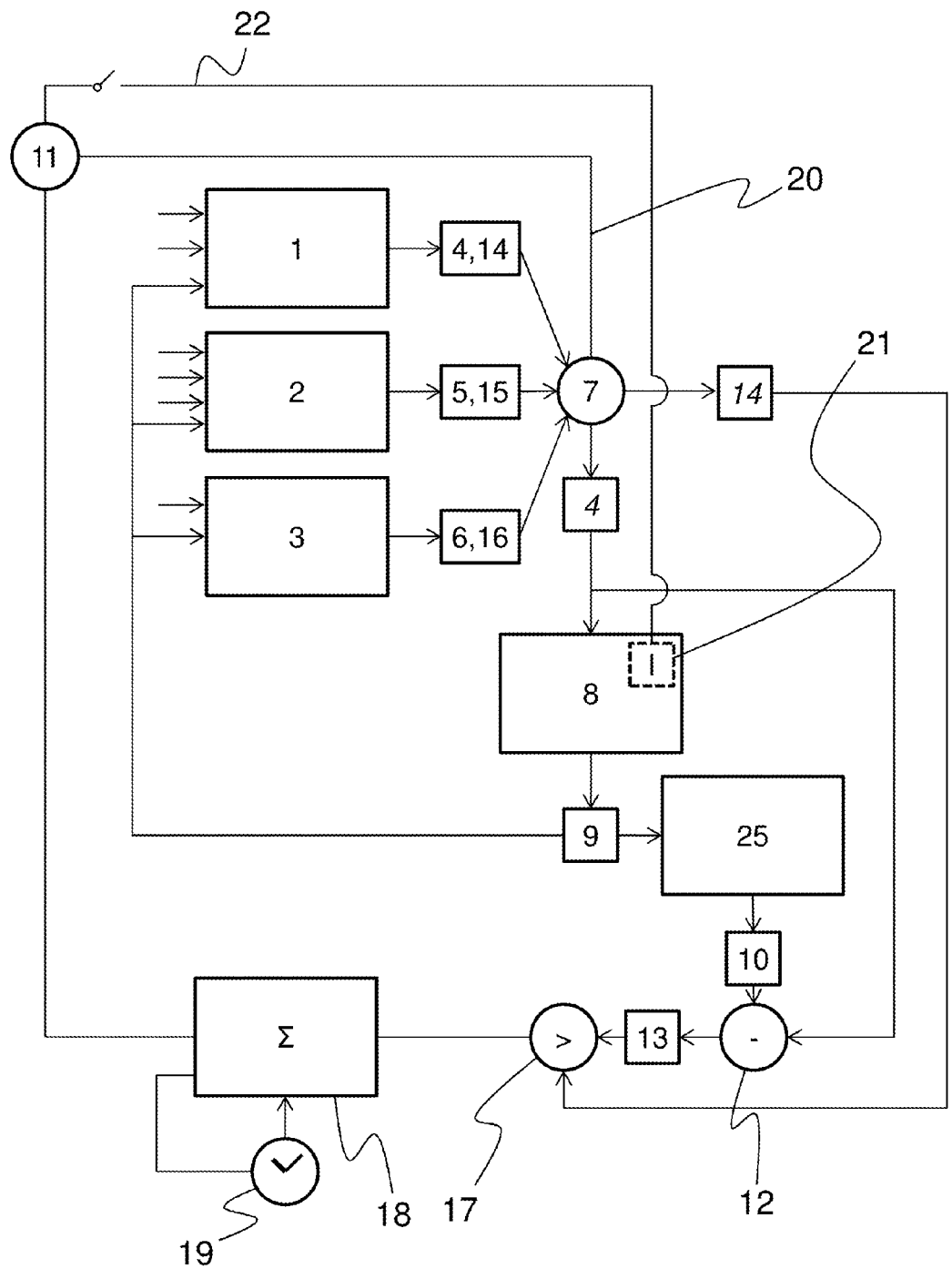
FIG. 1 is a schematic and block diagram illustrating the method described above.

Referring now in detail to the figures of the drawing for explaining the invention and the technical field in more detail by showing particularly preferred structural variants to which the invention is not restricted and in which proportions are diagrammatic, and first, particularly, to FIG. 1 thereof, there is seen a possible schematic and block diagram illustrating an implementation of a method for feeding reducing agent into an exhaust-gas mass flow in an exhaust-gas treatment device, according to the above description. In this case, a first dosing strategy 1, a second dosing strategy 2 and a third dosing strategy 3 are shown centrally. The dosing strategies each respectively generate a first target conversion rate 4 and a first threshold value 14, a second target conversion rate 5 and a second threshold value 15, and a third target conversion rate 6 and a third threshold value 16. A switching operator 7 decides, on the basis of a control signal 20 from a decision operator 11, which target conversion rate and which threshold value (in this example the first conversion rate 4 and the first threshold value 14) are used. The switching operator 7 may, however, also be positioned upstream of the dosing strategies, in such a way that, to save processing capacity, only one of the dosing strategies is implemented. A controller 8 calculates a reducing agent feed rate 9 that leads, in an SCR catalytic converter 25, to a present conversion rate 10. The present conversion rate 10 is compared with the selected target conversion rate (in this case the first target conversion rate 4) by way of a subtraction operator 12. This yields a deviation 13 which is compared with the selected threshold value (in this case the first threshold value 14) in a comparison operator 17. If the deviation 13 exceeds the threshold value 14, an entry is recorded in a memory operator 18. The memory operator 18 is for example, in the form of a counter. The total duration of the time for which the deviation 13 exceeds the first threshold value 14 is counted in the memory operator 18. If the total duration exceeds a predetermined maximum duration 19, a change is triggered in the decision operator 11. In this example, the reducing agent feed rate 9 is an input variable for each of the dosing strategies 1 to 3. Furthermore, different numbers of different input variables are illustrated, purely schematically, at the respective dosing strategies. Furthermore, it is possible to provide a reset signal 22 at the decision operator 11 for an integral component 21 of the regulator 8, which is reset for example in the event of a switch in dosing strategy. In this example, the predetermined maximum duration 19 is reset when the decision operator 11 is to be activated.

Figure 2:
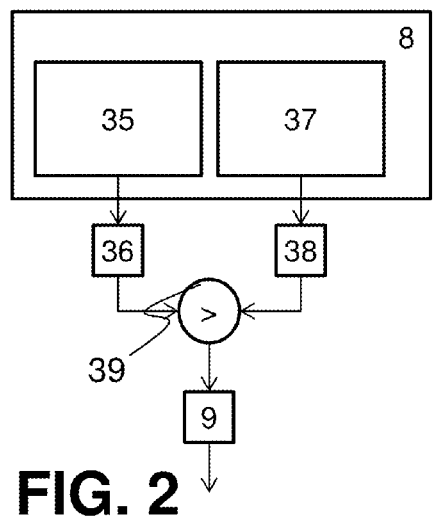
FIG. 2 is a schematic and block diagram of an alternative controller for the implementation of the method.

FIG. 2 shows an alternative controller 8 which includes a steady-state proportional-integral controller 35 and a dynamic proportional-integral controller 37. The steady-state proportional-integral controller 35 outputs a first control value 36 and the dynamic proportional-integral controller 37 outputs a second control value 38. The first control value 36 and the second control value 38 each correspond to a proposed reducing agent feed rate. Through the use of a selection processor 39, depending on whether a dynamic operating state or a steady operating state is present, the first control value 36 or the second control value 38 is selected and used as the reducing agent feed rate 9. The controller 8 may alternatively be used correspondingly in the schematic diagram according to FIG. 1.

Figure 3:
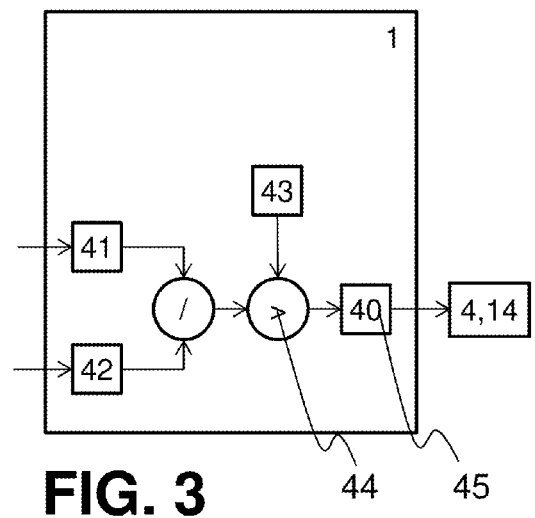
FIG. 3 is a schematic and block diagram of a dosing strategy with fill level resetting.

FIG. 3 shows a first dosing strategy 1 in which a fill level adjustment can be performed. A desired loading 41 is set in this case in a ratio with a maximum loading 42 by way of a differential operator 44. The ratio is compared with a threshold value 43 at a loading comparison operator 45, and a loading value 40 is thereupon reset. FIG. 3 is a detail illustration of the first dosing strategy 1 which is also illustrated and used in FIG. 1 (top left).

Figure 4:
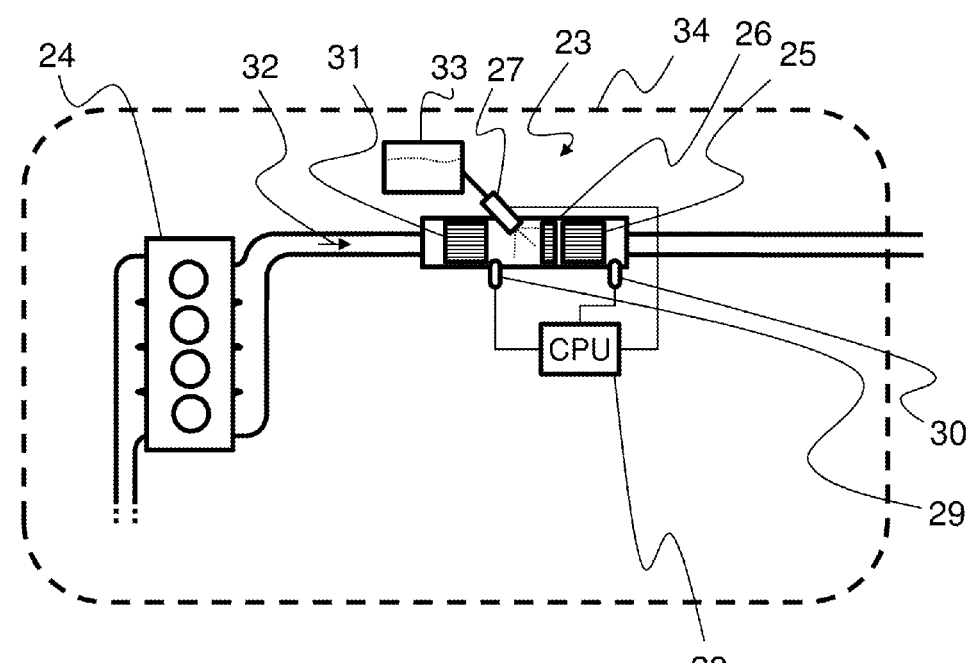
FIG. 4 is a plan view of a configuration of an exhaust-gas treatment device in a motor vehicle.

FIG. 4 shows a motor vehicle 34 in which an internal combustion engine 24 is connected to an exhaust-gas treatment device 23. An oxidation catalytic converter 31 and a downstream SCR catalytic converter 25 are disposed, for example, in a flow direction 32 in the exhaust-gas treatment device 23. A storage catalytic converter 26, which is provided upstream of the SCR catalytic converter 25, can store reducing agent which is fed through a feed point 27 connected to a reducing agent storage device or reservoir 33. Values for the respective dosing strategies are determined by using a first sensor 29 and a second sensor 30. The values constitute input variables for a control unit or controller 28, which controls a reducing agent feed rate 9 for the feed point 27 in accordance with a described method.

With the method proposed herein, it is possible to provide very exact dosing within very narrow thresholds and simultaneously react suitably to faults and other variations in the exhaust-gas treatment device.

The invention claimed is:

1. A method for feeding reducing agent into an exhaust-gas mass flow in an exhaust-gas treatment device, the method comprising the following steps:
   providing the exhaust-gas treatment device with a feed point for the reducing agent, a storage catalytic converter for storage of reducing agent, and an SCR catalytic converter for performing a selective catalytic reduction of nitrogen oxide compounds in the exhaust gas;
   a) implementing a first dosing strategy in which a loading of the storage catalytic converter with reducing agent is monitored and a first target conversion rate is determined on a basis of a present loading;
   b) feeding reducing agent in accordance with the first target conversion rate;
   c) determining a presently prevailing conversion rate attained with the SCR catalytic converter;
   d) comparing the presently prevailing conversion rate with the first target conversion rate, and registering a deviation of the presently prevailing conversion rate from the first target conversion rate; and
   e) switching to a further dosing strategy if the deviation exceeds a first threshold value, and disregarding the loading of the storage catalytic converter in the further dosing strategy.

2. The method according to claim 1, which further comprises performing step e) only if a deviation is registered in step d) over a time period being longer than a predetermined maximum duration.

3. The method according to claim 2, which further comprises, after step e), implementing the further dosing strategy for a predetermined time period being longer than the predetermined maximum duration, and subsequently switching back to the first dosing strategy according to step a).

4. The method according to claim 3, which further comprises using a fill level model being reset after the predetermined time period, to determine the loading of the storage catalytic converter.

5. The method according to claim 1, which further comprises setting a reduced second target conversion rate in the further dosing strategy.

6. The method according to claim 1, which further comprises:
   implementing the dosing strategy in step a) by using a steady-state proportional-integral controller if a steady operating state of the exhaust-gas treatment device prevails, and using a dynamic proportional-integral controller if a dynamic operating state of the internal combustion engine prevails; and
   in step d), performing a comparison between a first control value of the steady-state proportional-integral controller and a second control value of the dynamic proportional-integral controller and taking the comparison into consideration in addition to the deviation.

7. The method according to claim 1, which further comprises:

comparing the deviation with a series of threshold values; and selecting the further dosing strategy on a basis of the threshold values, in accordance with the following procedure:

upon a deviation smaller than the first threshold value: remain in the first dosing strategy;

upon a deviation smaller than a second threshold value and greater than the first threshold value: switch to a second dosing strategy; and upon a deviation smaller than a third threshold value and greater than the second threshold value: switch to a third dosing strategy.

8. The method according to claim 1, which further comprises repeating the method steps a) to e) at regular intervals in a loop.

9. An internal combustion engine in combination with:

an exhaust-gas treatment device for purification of exhaust gases of said internal combustion engine, said exhaust-gas treatment device having a feed point for reducing agent, a storage catalytic converter for storage of reducing agent, and an SCR catalytic converter for performing a selective catalytic reduction of nitrogen oxide compounds in the exhaust gas; and a control unit constructed and configured for:
 a) implementing a first dosing strategy in which a loading of said storage catalytic converter with reducing agent is monitored and a first target conversion rate is determined on a basis of a present loading;
 b) feeding reducing agent in accordance with said first target conversion rate;
 c) determining a presently prevailing conversion rate attained with said SCR catalytic converter;
 d) comparing said presently prevailing conversion rate with said first target conversion rate, and registering a deviation of said presently prevailing conversion rate from said first target conversion rate; and
 e) switching to a further dosing strategy if said deviation exceeds a first threshold value, and disregarding said loading of said storage catalytic converter in said further dosing strategy.

10. The combination according to claim 9, wherein the internal combustion engine and the exhaust gas treatment device part of a motor vehicle.

11. The combination according to claim 9, wherein the internal combustion engine and the exhaust gas treatment device part of a stationary installation.

* * * * *